United States Patent Office 3,104,204
Patented Sept. 17, 1963

3,104,204
ALPHA SARCIN
Birger H. Olson, Lansing, Mich., assignor to the State of Michigan
No Drawing. Filed July 11, 1960, Ser. No. 41,795
4 Claims. (Cl. 167—65)

The present invention relates to a new product which has been designated alpha sarcin and the preparation of the same.

The alpha sarcin of the present invention is produced by fermentation of an organism discovered in the soil on a farm in the State of Michigan and the organism has been designated as MDH-18,894 by the Michigan Department of Health, located in Lansing, Michigan. A culture of the alpha sarcin producing organism, MDH-18,894, has been deposited with the U.S. Department of Agriculture, Northern Utilization Research and Development Division, located in Peoria, Illinois, and has been assigned the numerical designation NRRL 2777.

Investigations show the alpha sarcin producing organism to be *Aspergillus giganteus*. This species is characterized by having long clavate conidiophores, containing sterigma on the upper portion of the conidiophore with smooth elliptical conidia. The conidial heads are typically pale blue-green in color. The alpha sarcin producing strain (NRRL 2777) produces very long conidiophores at a temperature of 20° C. and generally shows more frequent mutation or variation in sectors of the colony than usually found in this species. Except for this, however, organism NRRL 2777 is a very distinct strain of the species, *Aspergillus giganteus*.

Fermentation of NRRL 2777 is carried out in submerged form with agitation and aeration in an aqueous nutrient medium containing a standard carbon source and a nitrogen source of the available amino acid type noted below. With temperatures of around 30° C. fermentation is completed in approximately two days. The alpha sarcin produced during fermentation is recovered from the beer, after filtering off the insoluble material, by adsorption on an acetate or phosphate buffered carboxylic ion exchange resin prepared as described in detail below, followed by elution with either acid such as 1 N HCl, $H_3PO_4$ buffered with NaOH to pH 1–2, or with an alkaline solution such as 1 N $NH_4OH$, or the like. Mineral salts present in the alpha sarcin eluate are removed either by dialysis or by passing through a hydrogen form exchange resin, and the alpha sarcin then recovered as a dry product by freeze drying.

Alpha sarcin produced as described above is substantially insoluble in organic solvents such as acetone, methanol, ethanol, ethyl ether and neutral solvents, but is soluble in water and aqueous acids such as hydrochloric acid and aqueous alkaline solutions such as ammonium hydroxide, and the like. In aqueous solutions at pH 2 it is stable at 50° C. for 30 minutes and at 100° C. for 5 minutes and at pH 7 it is also stable at 50° C. for 5 minutes. It is not stable in aqueous solutions at pH 7 at 100° C. for 5 minutes and it is also not stable at pH 10 at 50° C. for 5 minutes. Chemically, the alpha sarcin product prepared as described above and in the examples below gives positive ninhydrin and biuret tests and negative starch, xanthoproteic, ferric chloride, cystine and cysteine S, permanganate, phosphate, pentose and ketose tests. Alpha sarcin can be precipitated from aqueous solutions such as the filtrate described below in Example I by addition of two volumes of methanol, ethanol or acetone. Alpha sarcin does not dialyze through a cellophane membrane and while it is readily adsorbed on activated carbon it is not adsorbed on an anion exchange resin in the hydroxide form or on a cation exchange resin in the hydrogen form.

The alpha sarcin prepared as described above and in the examples below also exhibits characteristic absorption bands in the infrared region of the spectrum when suspended in heavy refined paraffin oil, e.g. Nujol, at the following frequencies expressed in microns: 3.25; 6.15; 6.55; 9.3 and a broad band at 11.5, in addition to the characteristic bands of Nujol. These along with other data show that the alpha sarcin preparation prepared as described in detail below is made up of C, H, N, O and S. Analysis by the Clark Microanalytical Laboratory of Urbana, Illinois, also shows the alpha sarcin preparation to contain about 46.92% carbon, about 7.83% hydrogen, about 15.04% nitrogen, about 1.82% sulfur and about 26.16% oxygen. Based on this determination the appropriate empirical formula is $C_{68}H_{137}O_{29}N_{19}S$.

The amino acid composition of the alpha sarcin preparation was determined by two dimensional paper chromatography. A 10 mg. sample of alpha sarcin was hydrolyzed in a sealed tube with 1 ml. of 6 N HCl for six hours at 121° C. The HCl was removed and the sample tested by two dimensional chromatograms on Whatman No. 1 paper (18¼" by 22½" sheets). The chromatogram was run in one direction with butanol:acetic acid:water (250:60:250) and in the other direction with phenol:water (400 ml.:100 ml.) with 200 mg. of 8-OH quinoline added. After development and removal of all solvent, the amino acid positions were determined by ninhydrin. The known amino acids were run at the same time under the same conditions. The following amino acids were found to be present in the alpha sarcin hydrolysate:

Alanine
Aspartic acid
Glycine
Serine
Methionine
Histidine
Leucine
Lycine

One unknown was also found with $R_f$ 0.48 in butanol:acetic acid:water and with $R_f$ 0.58 in phenol:water. Staining with isatin instead of ninhydrin also disclosed the presence of proline in the hydrolysate.

The following examples will serve to illustrate the invention.

*Example I*

Percent w./v.
Corn starch _____ 2
Peptone _____ 1
Beef concentrate _____ 1
Salt (NaCl) _____ 0.5

The corn starch, peptone (pancreatic digest of meat), beef concentrate (Difco Bacto beef extract) and salt are mixed with water to provide the proportions noted above and then sterilized with steam in accordance with standard practices in the art. The resulting sterile nutrient medium is next inoculated with a culture of (or seeded with) the NRRL 2777 organism described above and allowed to grow under controlled temperature at about 30° C. with agitation and aeration (0.5–1.0 volume of air/volume of medium per minute) for about 48 hours. At the end of this period the fermented broth is press filtered to remove mycelium and other insoluble material. These materials can be discarded as the desired active material is water soluble and is present in the resulting filtrate. A cationic carboxylic exchange resin (Amberlite IRC–50) is first regenerated in sodium form by mixing 1 volume of exchange resin with about 10 volumes of 4% (1 N) sodium hydroxide. The resin is next separated from the alkali solution, washed with distilled water and suspended in water. To this suspension sufficient concentrated acetic acid is then added with stirring to provide the aqueous medium with a pH of about 4–8.5, with about pH 6.5–7.5 being preferred.

The resulting resin, which may be termed to be in acetate buffered form is finally separated from the aqueous medium and after washing with distilled water is ready for use as noted below.

The filtrate containing the active material described above is added to a column containing the acetate buffered exchange resin prepared as described above. With a preferred flow rate per minute of about 0.2 ml. filtrate/1 ml. resin, one volume of resin will remove the active material from about twenty volumes of filtrate. The column containing the active material is then washed with 2 volumes (based on the resin) of distilled water. The material is then eluted from the column with 1 N HCl. The volume of eluate which contains the active material is about 1/20 the volume of the original filtrate. For example, if the active material from 10 liters of filtrate is adsorbed on the column, the active material after elution from the column may be contained in about 500 ml. of eluate.

The pH of the acidic solution containing the active material is next adjusted to about pH 5 with aqueous sodium hydroxide and the sodium chloride and other mineral salts present removed from the solution by dialysis using a cellophane membrane. The resulting solution is then freeze dried to yield the desired alpha sarcin as a fluffy tan product.

*Example II*

This example follows Example I except (*a*) that the cationic carboxylic exchange resin regenerated in sodium form is buffered with phosphate by the addition of phosphoric acid to provide the aqueous medium with a pH of about 7, (*b*) that the alpha sarcin, after adsorption on the phosphate buffered resin, is eluted with 1 N $NH_4OH$, and (*c*) that in place of dialysis, the mineral salts are removed by passing the eluate containing the alpha sarcin through a hydrogen form sulfonic acid (Amberlite IR-120) resin. As in Example I, the eluate is freeze-dried to yield a light tan fluffy product.

The nutrient medium used to grow NRRL 2777 for the production of alpha sarcin contains, as noted above, available carbon and nitrogen. As for the carbon, various sources such as the starches, sugars such as glucose, lactose, etc. can be employed. As for the nitrogen, investigations show that the nitrogen should be present in amino acid or available amino acid type form such as the casein hydrolyzates, the peptides and the like. Other illustrative media which can be used in the present invention are as follows:

| | Percent (w./v.) |
|---|---|
| Corn starch | 2 |
| Peptone | 1 |
| Caseamino acids (acid hydrolyzed casein) | 1.5 |
| Salt | 0.5 |
| | |
| Corn starch | 2 |
| Peptone | 1 |
| NZ Amine (Sheffield Farms) (enzymatic hydrolyzed casein) | 1.5 |
| Salt | 0.5 |
| | |
| Corn starch | 2 |
| Peptone | 1 |
| Salt | 0.5 |
| | |
| Corn starch | 2 |
| Tryptone (tryptic digest of meat) | 2 |
| Salt | 0.5 |
| | |
| Glucose | 2 |
| Yeast extract | 1 |
| Meat extract | 1 |
| | |
| Corn starch | 2 |
| Peptone | 1 |
| Yeast extract | 1 |
| Meat extract | 1 |
| Salt | 0.5 |

The concentrations in the media can vary although the use of aqueous mixtures containing 1–3% (w./v.) of carbon and nitrogen sources of the type noted above are generally preferred. If the nutrient medium is not about neutral as may be the case where casein hydrolyzates are used, the pH is adjusted with aqueous sodium hydroxide to about pH 6–7.

The alpha sarcin preparation of the present invention is anti-fungal in character and has been found to inhibit the growth of Aspergilli, Penicillium and Actinomycetes such as the Streptomyces group, including all normal fungal contaminates of these and other types present in air. The alpha sarcin preparation, however, has been found at concentrations up to and including 1 mg./ml. to have no inhibitory action on the following bacteria: *Diplococcus pneumoniae,* type III; *Streptococcus hemolyticus,* five strains; *Pseudomonas aeruginosa; Shigella dysenteriae; Salmonella typhi; Salmonella typhimurium; Proteus morganii; Proteus vulgaris; Aerobacter aerogenes; Micrococcus pyogenes* var. *aureus; Escherichia coli,* 2 strains; *Bacillus subtilis,* 2 strains; *Sarcina lutea, Shigella raboulensis; Corynebacterium diphtheriae, Brucella abortus; Klebsiella pneumoniae; Mycobacterium tuberculosis; Mycobacterium phlei; Mycobacterium smegmatis.* In view of this lack of activity against bacteria, the alpha sarcin preparation can be used to advantage by diagnostic laboratories to inhibit unwanted fungal growth in bacterial cultures. For this purpose the alpha sarcin, in water solution, is thoroughly mixed with the nutrient agar or similar medium used to culture the bacteria, in a ratio of about 0.5 mg. of alpha sarcin to 1.0 ml. of medium. With a medium of this type *Staphlococcus aureus, Streptococcus hemolyticus, E. coli,* etc. can be cultured for diagnostic purposes free from contamination by fungal growth caused by organisms in the air such as *A. ochraceus, A. niger,* Pencillium molds, etc.

The alpha sarcin preparation of the present invention was supplied for tests in the anti-tumor field. In these tests it has been shown to have very high activity against Sarcoma 180 in mice and Carcinoma 755 in mice. Also, it has been shown to be active against 13 other different tumors in mice, rats and hamsters as tested by Sloane Kettering Institute for Cancer Research. The activity against Sarcoma 180 has been confirmed at the Michigan Department of Health Laboratories; Wisconsin Alumni Research Foundation; Microbiological Associates, Incorporated; Southern Research Institute; and at Sloane Kettering Institute for Cancer Research. In these tests, the alpha sarcin preparation is reported by the Cancer Chemotherapy National Service Center to have the greatest spread in concentration required for effective action against the tumors and the toxic concentrations of any anti-tumor agent yet isolated or tested.

This application is a continuation-in-part of my application Serial No. 817,064, filed June 1, 1959, now abandoned.

I claim:

1. A process for the production of alpha sarcin which comprises cultivating the organism *Aspergillus giganteus* NRRL 2777 in an aqueous nutrient medium containing a source of carbon and available amino acids as a source of nitrogen, and then recovering the alpha sarcin from the resulting fermented broth.

2. The process of claim 1 where the alpha sarcin in the broth is adsorbed on a sodium hydroxide regenerated carboxylic ion exchange resin buffered to pH 4–8.5, the alpha sarcin is eluted from the resin with aqueous hydrochloric acid, the resulting solution is dialyzed to removed mineral salts and the salt-free solution is freeze-dried to recover the alpha sarcin.

3. The process of claim 1 where the alpha sarcin in the broth is adsorbed on a sodium hydroxide regenerated carboxylic ion exchange resin buffered with phosphate to pH of about 6.5–7.5, the alpha sarcin is eluted from the resin with aqueous ammonium hydroxide, the resulting eluate is passed through a hydrogen form sulfonic acid exchange resin to remove mineral salts, and the salt-free solution is freeze-dried to recover the alpha sarcin.

4. The product produced by the process of claim 1, said product being soluble in water and insoluble in acetone and ethanol, being characterized by positive ninhydrin and biuret tests and by exhibiting characteristic absorption bands in the infrared region of the spectrum when suspended in heavy paraffin oil at the following frequencies expressed in microns: 3.25; 6.15; 6.55; 9.3 and a broad band at 11.5, said product being composed of C, H, N, O and S and having the empirical formula $C_{68}H_{137}O_{29}N_{19}S$.

No references cited.